United States Patent [19]

Do

[11] Patent Number: 4,861,207
[45] Date of Patent: Aug. 29, 1989

[54] BARREL NUT FASTENER APPARATUS

[75] Inventor: Tai H. Do, Fountain Valley, Calif.

[73] Assignee: Rexnord Inc., Torrance, Calif.

[21] Appl. No.: 210,798

[22] Filed: Jun. 24, 1988

[51] Int. Cl.⁴ ............................................. F16B 37/00
[52] U.S. Cl. .................................... 411/104; 411/108; 411/970
[58] Field of Search ................... 411/84, 85, 104, 108, 411/109, 112, 432, 103, 352, 353, 970

[56] References Cited

U.S. PATENT DOCUMENTS

| | | | |
|---|---|---|---|
| 2,120,462 | 6/1938 | Ferguson | 411/531 X |
| 2,789,457 | 4/1957 | Allen | 411/432 |
| 2,825,379 | 3/1958 | Becker | 411/104 |
| 2,903,035 | 9/1959 | Davenport et al. | 411/104 |
| 2,920,672 | 1/1960 | Bronson | 411/104 |
| 3,081,809 | 3/1963 | Rohe | 411/104 |
| 3,192,982 | 7/1965 | Rohe et al. | 411/104 |
| 3,205,927 | 9/1965 | Phelan | 411/104 |
| 3,208,496 | 9/1965 | Phelan | 411/104 |
| 3,217,585 | 11/1965 | Munse | 411/432 |
| 3,322,177 | 5/1967 | Phelan | 411/104 |
| 3,455,362 | 7/1969 | Mohrman | 411/103 |
| 4,119,130 | 10/1978 | Berecz | 411/104 |
| 4,227,561 | 10/1980 | Melina | 411/103 |

FOREIGN PATENT DOCUMENTS 483089 4/1938 United Kingdom .

OTHER PUBLICATIONS

National Aerospace Standard NA0134 1981.
National Aerospace Standard NA0133 1981.
Shur-Lok Corporation SL40 Series 1966.
Shur-Lok Corporation SLR40 Series 1966.

Primary Examiner—Gary L. Smith
Assistant Examiner—Douglas E. Ringel
Attorney, Agent, or Firm—Pretty, Schroeder, Brueggemann & Clark

[57] ABSTRACT

A barrel nut fastener apparatus that includes a nut loosely retained in a prescribed position by a retainer that is adapted to be slidably received in a cylindrical bore formed in a panel. The nut is carried loosely on a seat formed in the retainer and is positioned to threadedly receive a bolt projecting through aligned transverse holes in both the panel and the retainer. The nut and seat have conforming cross-shaped configurations such that the compressive force of their engagement is distributed over a relatively large area, thereby substantially reducing the possibility of the nut being deformed if the bolt is overtightened.

20 Claims, 2 Drawing Sheets

BARREL NUT FASTENER APPARATUS

BACKGROUND OF THE INVENTION

This invention relates generally to floating nuts, and, more particularly, to floating nuts carried loosely by generally cylindrical retainers adapted to be slid into a cylindrical bore of a panel.

Fastener apparatus of this particular kind are useful in fastening together two panels subject to high separation forces and to limited lateral displacement relative to each other. One example of such a fastener apparatus is disclosed in U.S. Pat. No. 3,081,809, issued to F. W. Rohe. The disclosed apparatus includes a nut having a threaded bore for receiving a conventional bolt and a generally cylindrical retainer for loosely supporting the nut in a prescribed position while permitting the nut to move by limited amounts in directions both perpendicular and parallel to the nut's longitudinal axis. A transverse hole is formed in the retainer, aligned with the nut's threaded bore, to guide the bolt into threaded engagement with the nut.

The retainer is sized to slide smoothly into a cylindrical bore formed in one of the panels, to a position where the retainer's transverse hole aligns with a transverse hole formed in the panel. the bolt can thereafter be inserted through the aligned holes, to threadedly engage the nut.

Although the barrel nut fastener apparatus described briefly above has proven to be generally effective, it has not proven to be entirely satisfactory in all situations. For example, only a small portion of the nut extends beyond the perimeter of the transverse hole formed in the retainer, which guides the bolt to the nut. Consequently, very high compressive stresses can arise at the interface between the nut and the retainer. This can sometimes cause the nut to deform.

It should, therefore, be appreciated that there is a need for an improved barrel nut fastener apparatus in which the compressive forces between the nut and the retainer that loosely retains the nut are prevented from physically deforming the nut. the present invention fulfills this need.

SUMMARY OF THE INVENTION

Briefly, and in general terms, the present invention is embodied in a barrel nut fastener apparatus that includes a nut and retainer means for loosely retaining the nut in a prescribed position so as to threadedly receive a bolt, the nut and retaining means being configured to engage each other over a relatively large area such that localized compressive stresses are reduced and the possibility of material deformation is avoided.

More particularly, the nut has a generally cross-shaped configuration in a plane perpendicular to the axis of its threaded bore. This configuration includes four generally rectangular wings projecting laterally away from the threaded bore, along two mutually perpendicular transverse axes. The retainer means, which is adapted to be positioned within a cylindrical bore formed in a panel, includes a partial cylindrical body sized to slide into the bore, along with means defining a generally cross-shaped seat for conformably receiving the nut. The seat is sized to permit limited movement of the nut along the transverse axes of the nut wings. In addition, the retainer means includes a hole extending through the partial cylindrical body and emerging in a center portion of the generally cross-shaped seat. This hole aligns with a correspondingly sized hole in the panel, to guide the bolt into threaded engagement with the nut. When the bolt threadedly tightens into the nut and the nut therefore compressively engages the seat of the retainer means, the four wings of the nut distribute this compressive force over an area sufficiently large to ensure that no material deformation of the nut will occur.

In another feature of the invention, the cross-shaped seat of the retainer means is defined by a pair of thin, spaced-apart walls located at each end of the partial cylindrical body. Each of these walls includes an outwardly-facing circular arc segment that forms an extension of the partial cylindrical body. In addition, circular grooves can be formed at each end of the partial cylindrical body, in the cylindrical surface of the body and the walls. Resilient rings are disposed in these grooves, to overlay the two wings of the nut that project along an axis parallel with the axis of the partial cylindrical body, to retain the nut in its prescribed position.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
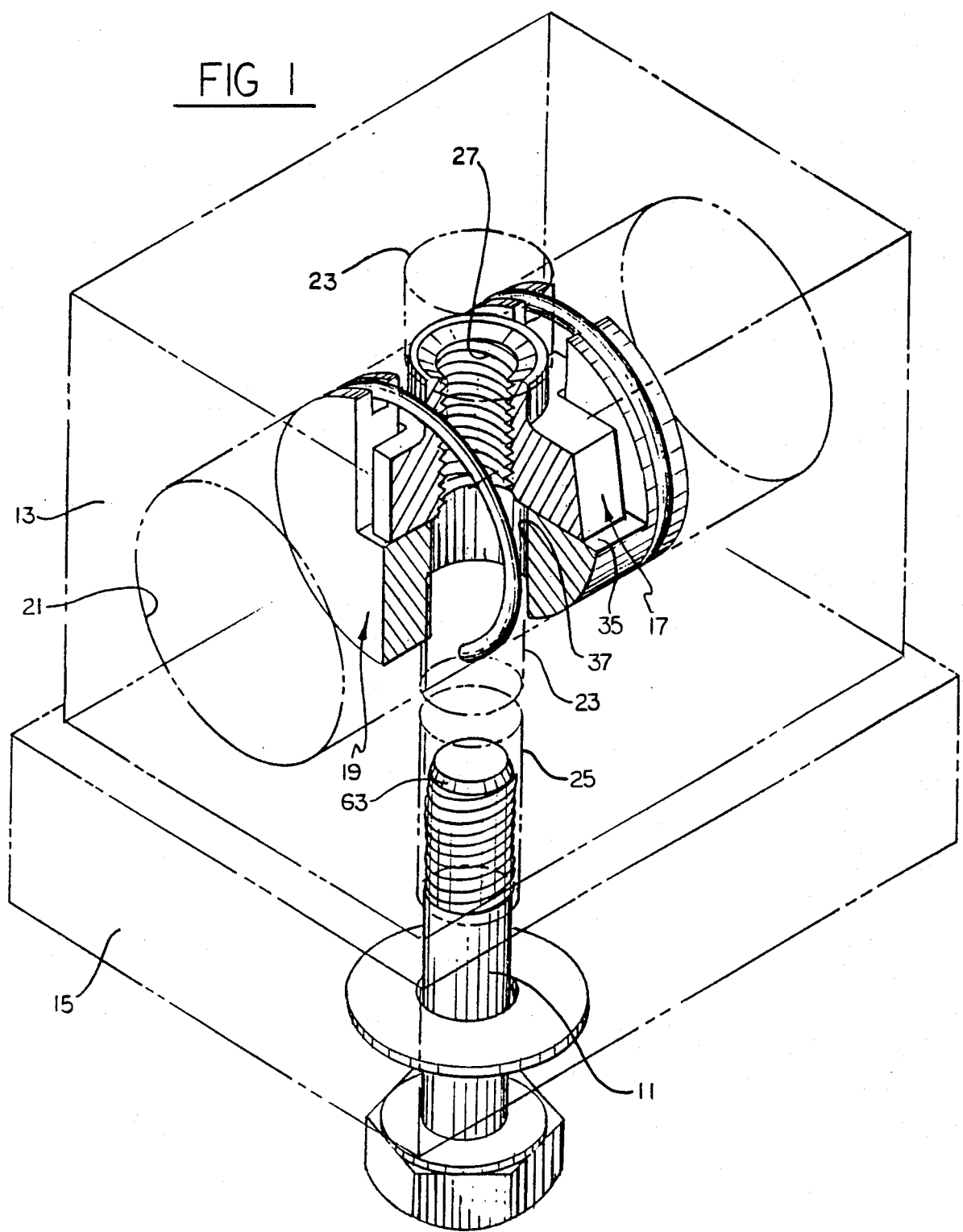
FIG. 1 is a perspective view, partially in section, of a barrel nut fastener apparatus in accordance with the invention, the fastener apparatus being depicted in association with a bolt and two panels to be secured to each other.

With reference now to the drawings, and particularly to FIG. 1, there is shown a fastener apparatus adapted for use with a conventional bolt 11 in fastening together two panels 13 and 15 that are subject to a high separation force and limited lateral displacement relative to each other. The fastener apparatus includes a nut 17 and a retainer 19 for loosely supporting the nut in a prescribed position within a cylindrical bore 21 formed in one of the two panels. The nut is supported in a position such that it can threadedly receive the bolt through aligned transverse holes 23 and 25 formed in the respective panels 13 and 15.

Figure 2:
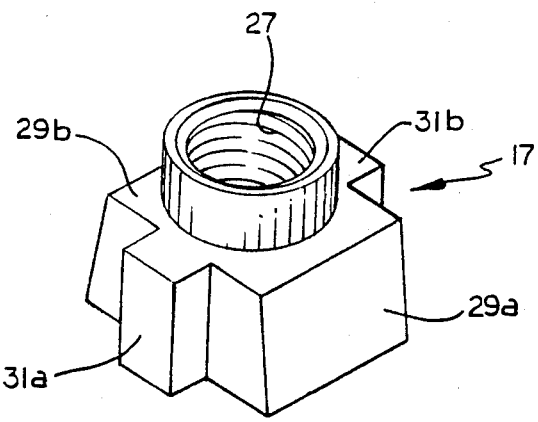
FIG. 2 is an exploded perspective view of the barrel nut fastener apparatus of FIG. 1.

The nut 17 has a threaded bore 27 and a generally cross-shaped configuration in a plane perpendicular to the axis of the bore, as best depicted in FIG. 2. This cross-shaped configuration is characterized by four generally rectangular wings 29a, 29b, 31a and 31b projecting outwardly from the threaded bore, along mutually-perpendicular axes.

The retainer 19 includes a body 33 in the form of a partial cylinder, with a curved surface that constitutes about 120 degrees of a complete cylinder. End walls of the retainer are oriented substantially perpendicular to the partial cylinder's longitudinal axis. The partial cylindrical body is sized to be slidable smoothly into the cylindrical bore 21 of the panel 13. A flat seat 35 is defined on the side of the body opposite the partial cylindrical surface, for conformably receiving the nut 17 and supporting it in a position to threadedly receive the bolt 11. A transverse hold 37 extends completely through the body, substantially perpendicular to the seat 35 and located substantially in the seat's center, to allow the bolt to threadedly engage the nut from its underside. The seat is configured to prevent the nut from rotating while a bolt is being threaded into it.

With reference again to FIG. 1 it can be seen that the partial cylindrical body 33 of the retainer 19 is slidable into the cylindrical bore 21 of the panel 13, to a point where the transverse hole 37 of the retainer is substantially aligned with the correspondingly-sized transverse holes 23 and 25 formed in the two panels 13 and 15, respectively. The bolt 11 projects through these transverse panel holes and the transverse retainer hole to threadedly engage the threaded bore 27 of the nut 17.

The flat seat 35 formed on one surface of the partial cylindrical body 33 has a cross-shaped configuration that conforms with the cross-shaped configuration of the nut 17. The nut can thereby be received on the seat with two of its wings 31a and 31b projecting along an axis parallel with the body's cylindrical axis and the other two of its wings 29a and 29b oriented transverse to that axis.

Figure 3:
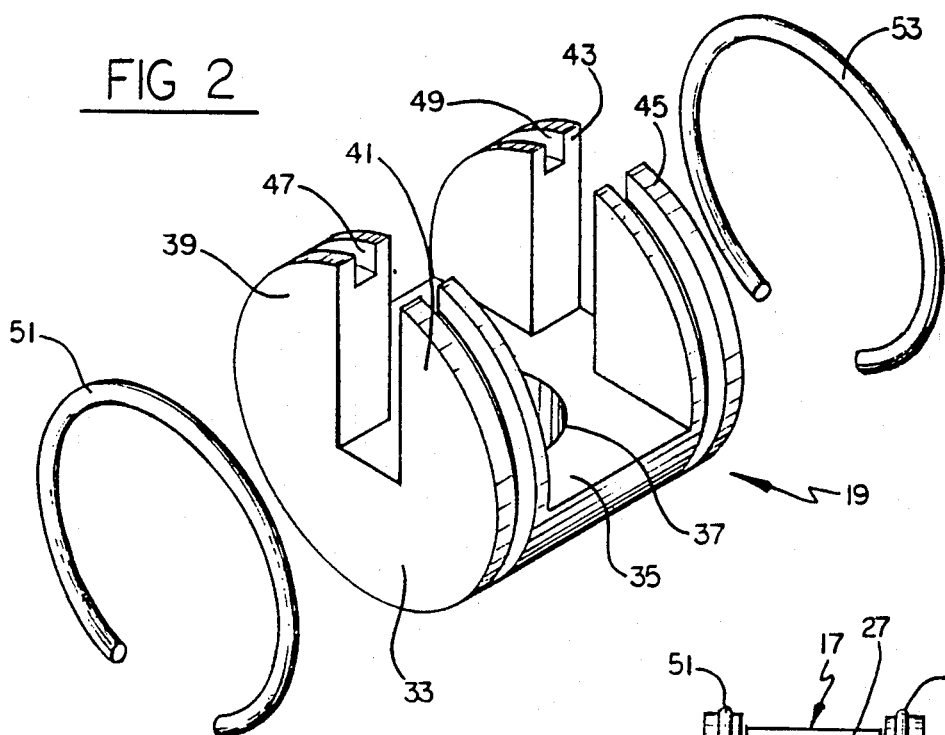
FIG. 3 is a top plan view of the barrel nut fastener apparatus of FIG. 1.
Figure 3:
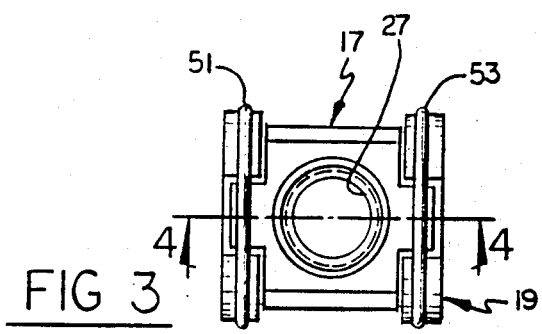
Figure 5:
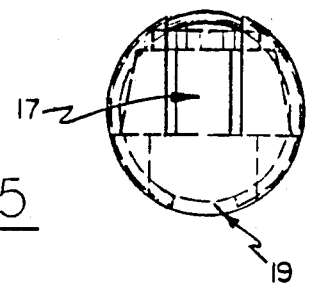
FIG. 5 is an end view of the barrel nut fastener apparatus of FIG. 1.
Figure 4:
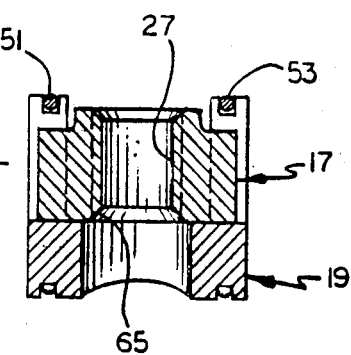
FIG. 4 is a side sectional view of the barrel nut fastener apparatus, taken substantially in the direction of the arrows 4—4 in FIG. 3.

The flat, cross-shaped seat 35 is defined by four upstanding walls 39, 41, 43 and 45 located at the corners of the seat. As best shown in FIG. 3, the two walls 39 and 41 located at one end of the partial cylindrical body 33 are spaced apart from each other by an amount sized to accommodate the wing 31a of the nut 17. Similarly, the two remaining walls 43 and 45, located at the opposite end of the body, are spaced apart from each other to accommodate the wing 31b of the nut. Outer surfaces of the four walls are curved by an amount corresponding to the curved surface of the body 33 such that those walls are shaped like extensions of the cylinder.

Circular grooves 47 and 49 are formed in the outer, curved surfaces of the partial cylindrical body 33 and the four walls 39, 41, 43, and 45, for receiving and retaining resilient circular rings 51 and 53, respectively. These rings overlie the wings 31a and 31b of the nut 17, to prevent the nut from moving excessively away from the seat 35, along the axis of its threaded bore 27.

In use, the fastener apparatus, with the nut 17 loosely retained on the seat 35 of the retainer 19 by the two rings 51 and 53 overlying the nut's resilient wings 31a and 31b, is slid into the cylindrical bore 21 of the panel 13. When the apparatus has been slid within the bore to a point where the body's transverse hole 37 is aligned with the transverse bolt hole 23 formed in the panel 13, the bolt 11 can be inserted through the transverse holes 23 and 25 of the two panels 13 and 15, to threadedly engage the nut's threaded bore 27. A frusto-conical beveled surface 63 on the leading end of the bolt 11 and a corresponding frusto-conical beveled surface 65 on the underside of the nut 17 ensure a self-centering of the nut on the bolt, even if they are not precisely initially aligned with each other.

When the bolt 11 is fully tightened into the nut 17, the nut will be drawn downwardly to compressively engage the seat 35 defined on one surface of the retainer's partial cylindrical body 33. The compressive force is distributed over the entire underside of the nut's four wings 29a, 29b, 31a and 31b, which project well beyond the periphery of the body's transverse hole 37. This distribution of force over a relatively large area substantially reduces the possibility that the nut might be physically deformed because of an excessive tensile force on the bolt.

When the bolt 11 is initially being threaded into the nut 17, limited misalignment of the bolt and nut can be accommodated by transverse movement of the nut along an axis perpendicular to the bolt's longitudinal axis. The amount of such movement that is permitted is evident in FIG. 3, which depicts narrow gaps between the nut and the four confining walls 39, 41, 43 and 45. This same transverse movement is permitted in some circumstances even after the bolt has been threaded into the nut, when the two panels 13 and 15 undergo limited lateral displacement relative to each other.

It should be appreciated from the foregoing description that the present invention provides an improved barrel nut fastener apparatus having reduced susceptibility to material deformation due to an overtightening of a bolt with respect to it and that is easily installed into a cylindrical bore formed in a panel where it will reliably maintain a nut in a prescribed position to receive the bolt.

Although the invention has been described in detail with reference to the presently preferred embodiment, those of ordinary skill in the art will appreciate that various modifications can be made without departing from the invention. Accordingly, the invention is defined only by the following claims and equivalents thereof.

I claim:

1. A barrel nut fastener apparatus adapted to be positioned within a cylindrical bore in a panel and to threadedly receive a bolt extending through a bolt hole in the panel, the bolt hole being oriented transversely to the cylindrical bore, the apparatus comprising:

a nut having a threaded bore with a longitudinal axis and further having a generally cross-shaped configuration in a plane perpendicular to the longitudinal axis, the cross-shaped configuration including four generally rectangular wings projecting laterally away from the threaded bore along two mutually-perpendicular transverse axes; and retainer means adapted to be positioned with the cylindrical bore in the panel, for supporting the nut in a position to threadedly receive the bolt extending through the bolt hole in the panel oriented transversely to the cylindrical bore, the retainer means including a partial cylindrical body sized to be slidable into the cylindrical bore in the panel, means defining a generally cross-shaped seat for conformably receiving the nut in a prescribed position, the seat being sized to permit limited movement of the nut along transverse axes perpendicular to the nut's longitudinal axis while preventing rotation of the nut about the longitudinal axis, means defining a first circular groove in the outer surface of the partial cylindrical body, a first resilient ring disposed in the first circular groove and overlying the nut, to retain the nut in its prescribed position on the cross-shaped seat, and means defining a bore extending through the partial cylindrical body and emerging in a center portion of the generally cross-shaped seat, the bore being oriented substantially perpendicular to the seat and configured to guide the bolt into threaded engagement with the nut.

2. A barrel nut fastener apparatus as defined in claim 1, wherein the four wings of the nut project a substantial distance beyond the perimeter of the bore in the center portion of the seat of the retainer means, such that the nut and seat are adapted to compressively engage each other over a sufficiently large area to prevent the nut from deforming when threadedly engaged by the bolt.

3. A barrel nut fastener apparatus as defined in claim 1, wherein the retainer means further includes:
   means defining a second circular groove in the outer surface of the partial cylindrical body, wherein the first and second grooves are located at opposite ends of the body; and
   a second resilient ring disposed in the second groove, wherein the rings overlie two wings of the nut that project along an axis parallel with a longitudinal axis of the partial cylindrical body, to retain the nut in its prescribed position on the cross-shaped seat.

4. A barrel nut fastener apparatus as defined in claim 3, wherein the first and second resilient rings are circular.

5. A barrel nut fastener apparatus as defined in claim 3, wherein:
   the means defining the generally cross-shaped seat includes four thin, spaced-apart walls projecting from the partial cylindrical body, each wall including an outwardly-facing circular arc segment that forms an extension of the partial cylindrical body, the space between each adjacent pair of walls being sized to receive a separate wing of the nut; and
   the first and second circular grooves extend into the outwardly-facing circular arc segments of the four walls.

6. A barrel nut fastener apparatus as defined in claim 1, wherein the means defining the generally cross-shaped seat includes four thin, spaced-apart walls projecting from the partial cylindrical body, each wall including an outwardly-facing circular arc segment that forms an extension of the partial cylindrical body, the space between each adjacent pair of walls being sized to receive a separate wing of the nut.

7. A barrel nut fastener apparatus adapted to be positioned within a cylindrical bore in a panel and to threadedly receive a bolt extending through a bolt hole in the panel, the bolt hole being oriented transversely to the cylindrical bore, the apparatus comprising:
   a nut having a threaded bore with a longitudinal axis and further having a predetermined non-circular configuration in a plane perpendicular to the longitudinal axis; and
   retainer means adapted to be positioned within the cylindrical bore formed in the panel, for supporting the nut in a position to threadedly receive the bolt extending through the bolt hole in the panel oriented transversely to the cylindrical bore, the retainer means including
   a partial cylindrical body sized to be slidable into the cylindrical bore formed in the panel,
   means defining a flat seat for conformably receiving the nut in a prescribed position, the seat being sized to permit limited movement of the nut along transverse axes perpendicular to the nut's longitudinal axis while preventing rotation of the nut about its longitudinal axis,
   means defining a first circular groove in the outer surface of the partial cylindrical body,
   a first resilient ring disposed in the first circular groove and overlying the nut, to retain the nut in its prescribed position on the flat seat, and
   means defining a bore extending through the partial cylindrical body and emerging in a center portion of the seat, the bore being oriented substantially perpendicular to the seat and configured to guide the bolt into threaded engagement with the nut.

8. A barrel nut fastener apparatus as defined in claim 7, wherein the nut has a generally cross-shaped configuration in a plane perpendicular to its longitudinal axis, the cross-shaped configuration including four generally rectangular wings projecting laterally away from the threaded bore along two mutually-perpendicular transverse axes.

9. A barrel nut fastener apparatus as defined in claim 8, wherein the retainer means further includes:
   means defining a second circular groove in the outer surface of the partial cylindrical body, wherein the first and second grooves are located at opposite ends of the body; and
   a second resilient ring disposed in the second groove, wherein the rings overlie two wings of the nut that project along an axis parallel with a longitudinal axis of the partial cylindrical body, to retain the nut in its prescribed position on the flat seat.

10. A barrel nut fastener apparatus as defined in claim 9, wherein the first and second rings are circular.

11. A barrel nut fastener apparatus as defined in claim 9, wherein:
   the means defining the generally cross-shaped seat includes four thin, spaced-apart walls projecting from the partial cylindrical body, each wall including an outwardly-facing circular arc segment that forms an extension of the partial cylindrical body, the space between each adjacent pair of walls being sized to receive a separate wing of the nut; and
   the first and second circular grooves extend into the outwardly-facing circular arc segments of the four walls.

12. A barrel nut fastener apparatus as defined in claim 8, wherein the means defining the generally cross-shaped seat includes four thin, spaced-apart walls projecting from the partial cylindrical body, each wall including an outwardly-facing circular arc segment that forms an extension of the partial cylindrical body, the space between each adjacent pair of walls being sized to receive a separate wing of the nut.

13. A barrel nut fastener apparatus adapted to be positioned within a cylindrical bore in a panel and to threadedly receive a bolt extending through a bolt hole in the panel, the bolt hole being oriented transversely to the cylindrical bore, the apparatus comprising:
   a nut having a threaded bore with a longitudinal axis and further having a generally cross-shaped configuration in a plane perpendicular to the longitudinal axis, the cross-shaped configuration including four generally rectangular wings projecting laterally away from the threaded bore along two mutually-perpendicular transverse axes; and
   retainer means adapted to be positioned within the cylindrical bore in the panel for supporting the nut in a position to threadedly receive the bolt extending through the bolt hole in the panel oriented transversely to the cylindrical bore, the retainer means including
  a partial cylindrical body sized to be slidable into the cylindrical bore,
  means defining a flat, generally cross-shaped seat for conformably receiving the nut in a prescribed position, while permitting limited movement of the nut along transverse axes perpendicular to the nut's longitudinal axis,
  wherein the means defining the generally cross-shaped seat includes four thin, spaced-apart walls projecting from the partial cylindrical body, each wall having an outwardly-facing circular arc segment that forms an extension of the partial cylindrical body, the space between each adjacent pair of walls being sized to receive a separate wing of the nut,
  means defining a first circular groove in the outer surface of the partial cylindrical body,
  a first resilient ring disposed in the first circular groove and overlying the nut, to retain the nut in its prescribed position on the cross-shaped seat, and
  means defining an opening extending through the partial cylindrical body, to guide the bolt into engagement with the nut.

14. A barrel nut fastener apparatus as defined in claim 13, wherein the four wings of the nut project a substantial distance beyond the perimeter of the bore in the center portion of the seat of the retainer means, such that the nut and seat are adapted to compressively engage each other over a sufficiently large area to prevent the nut from deforming when threadedly engaged by the bolt.

15. A barrel nut fastener apparatus as defined in claim 13, wherein the retainer means further includes:
  means defining a second circular groove in the outer surface of the partial cylindrical body, wherein the first and second grooves are located at opposite sides of the body; and
  a second resilient ring disposed in the second groove, wherein the rings overlie two wings of the nut that project along an axis parallel with a longitudinal axis of the partial cylindrical body, to retain the nut in its prescribed position on the cross-shaped seat.

16. A barrel nut fastener apparatus as defined in claim 15, wherein the first and second resilient rings are circular.

17. A barrel nut fastener as defined in claim 15, wherein the first and second circular grooves extend into the outwardly-facing circular arc segments of the four walls.

18. A barrel nut fastener apparatus adapted to be positioned within a cylindrical bore in a panel and to threadedly receive a bolt extending through a bolt hole in the panel, the bolt hole being oriented transversely to the cylindrical bore, the apparatus comprising:
  a nut having a threaded bore with a longitudinal axis and further having a generally cross-shaped configuration in a plane perpendicular to the longitudinal axis, the cross-shaped configuration including four generally rectangular wings projecting laterally away from the threaded bore along two mutually-perpendicular transverse axes; and
  retainer means adapted to be positioned within the cylindrical bore in the panel, for supporting the nut in a position to threadedly receive the bolt extending through the bolt hole in the panel oriented transversely to the cylindrical bore, the retainer means including
  a partial cylindrical body sized to be slidable into the cylindrical bore in the panel,
  means defining a generally cross-shaped seat for conformably receiving the nut in a prescribed position, the seat being sized to permit limited movement of the nut along transverse axes perpendicular to the nut's longitudinal axis while preventing rotation of the nut about the longitudinal axis,
  means defining first and second circular grooves in the outer surface of the partial cylindrical body, at opposite ends of the body,
  first and second resilient rings disposed in the respective first and second grooves, the rings overlying two wings of the nut that project along an axis parallel with a longitudinal axis of the partial cylindrical body, to retain the nut in its prescribed position on the cross-shaped seat, and
  means defining a bore extending through the partial cylindrical body and emerging in a center portion of the generally cross-shaped seat, the bore being oriented substantially perpendicular to the seat and configured to guide the bolt into threaded engagement with the nut.

19. A barrel nut fastener apparatus adapted to be positioned within a cylindrical bore in a panel and to threadedly receive a bolt extending through a bolt hole in the panel, the bolt hole being oriented transversely to the cylindrical bore, the apparatus comprising:
  a nut having a threaded bore with a longitudinal axis and further having a generally cross-shaped configuration in a plane perpendicular to the longitudinal axis, with four generally rectangular wings projecting laterally away from the threaded bore along two mutually perpendicular transverse axes; and
  retainer means adapted to be positioned within the cylindrical bore formed in the panel, for supporting the nut in a position to threadedly receive the bolt extending through the bolt hole in the panel oriented transversely to the cylindrical bore, the retainer means including
  a partial cylindrical body sized to be slidable into the cylindrical bore formed in the panel,
  means defining a flat seat for conformably receiving the nut in a prescribed position, the seat being sized to permit limited movement of the nut along transverse axes perpendicular to the nut's longitudinal axis while preventing rotation of the nut about its longitudinal axis,
  means defining first and second circular grooves in the outer surface of the partial cylindrical body, at opposite ends of the body,
  first and second resilient rings disposed in the respective first and second grooves, the rings overlying two wings of the nut that project along an axis parallel with a longitudinal axis of the partial cylindrical body, to retain the nut in its prescribed position on the flat seat, and
  means defining a bore extending through the partial cylindrical body and emerging in a center portion of the seat, the bore being oriented substantially perpendicular to the seat and configured to guide the bolt into threaded engagement with the nut.

20. A barrel nut fastener apparatus adapted to be positioned within a cylindrical bore in a panel and to threadedly receive a bolt extending through a bolt hole in the panel, the bolt hole being oriented transversely to the cylindrical bore, the apparatus comprising:

a nut having a threaded bore with a longitudinal axis and further having a generally cross-shaped configuration in a plane perpendicular to the longitudinal axis, the cross-shaped configuration including four generally rectangular wings projecting laterally away from the threaded bore along two mutually-perpendicular transverse axes; and retainer means adapted to be positioned within the cylindrical bore in the panel, for supporting the nut in a position to threadedly receive the bolt extending through the bolt hole in the panel oriented transversely to the cylindrical bore, the retainer means including a partial cylindrical body sized to be slidable into the cylindrical bore, means defining a flat, generally cross-shaped seat for conformably receiving the nut in a prescribed position, the seat being sized to permit limited movement of the nut along transverse axes perpendicular to the nut's longitudinal axis, wherein the means defining the generally cross-shaped set includes four thin, spaced-apart walls projecting from the partial cylindrical body, each wall having an outwardly-facing circular arc segment that forms an extension of the partial cylindrical body, the space between each adjacent pair of walls being sized to receive a separate wing of the nut, means defining first and second circular grooves in the outer surface of the partial cylindrical body, at opposite ends of the body; and first and second resilient rings disposed in the respective first and second grooves, the rings overlying two wings of the nut that project along an axis parallel with a longitudinal axis of the partial cylindrical body, to retain the nut in its prescribed position on the cross-shaped seat, and means defining an opening extending through the partial cylindrical body, to guide the bolt into threaded engagement with the nut.

* * * * *

UNITED STATES PATENT AND TRADEMARK OFFICE
CERTIFICATE OF CORRECTION

PATENT NO. : 4,861,207
DATED : August 29, 1989
INVENTOR(S) : Tai Huu Do

It is certified that error appears in the above-identified patent and that said Letters Patent is hereby corrected as shown below:

Column 1, line 26, change "the" (second occurrence) to --The --.

Column 3, line 52, delete --resilient--.

Column 4, line 48 change "with" to --within--.

Signed and Sealed this

Twenty-eighth Day of August, 1990

Attest:

HARRY F. MANBECK, JR.

*Attesting Officer*   *Commissioner of Patents and Trademarks*